(No Model.) 4 Sheets—Sheet 3.
G. SCHÜRLE.
CULTIVATOR.
No. 370,977. Patented Oct. 4, 1887.
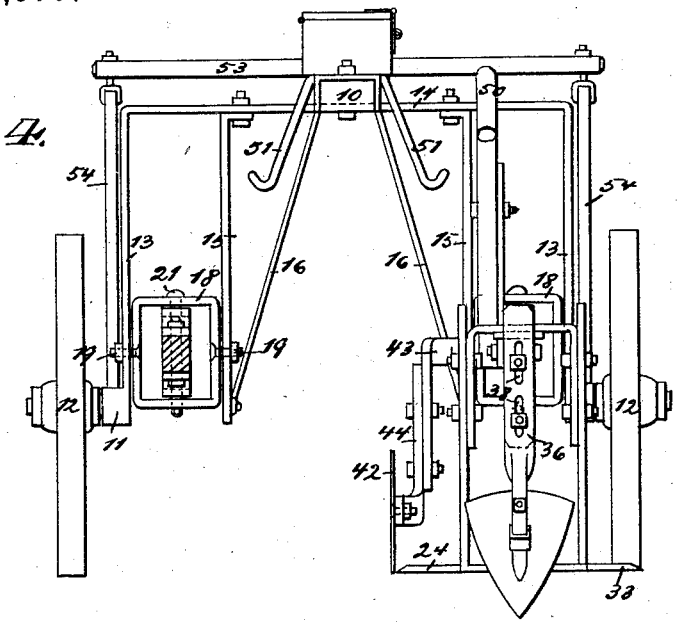
WITNESSES:
INVENTOR:
G. Schürle
BY
Munn &Co.
ATTORNEYS.

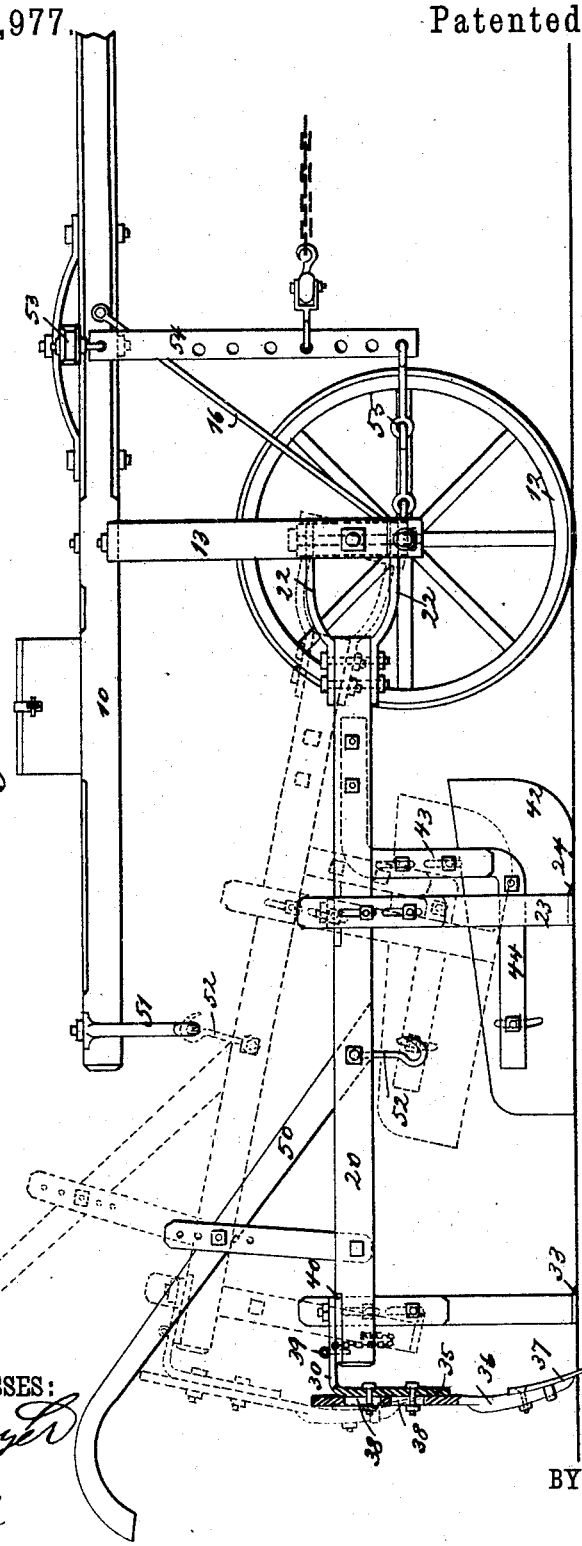

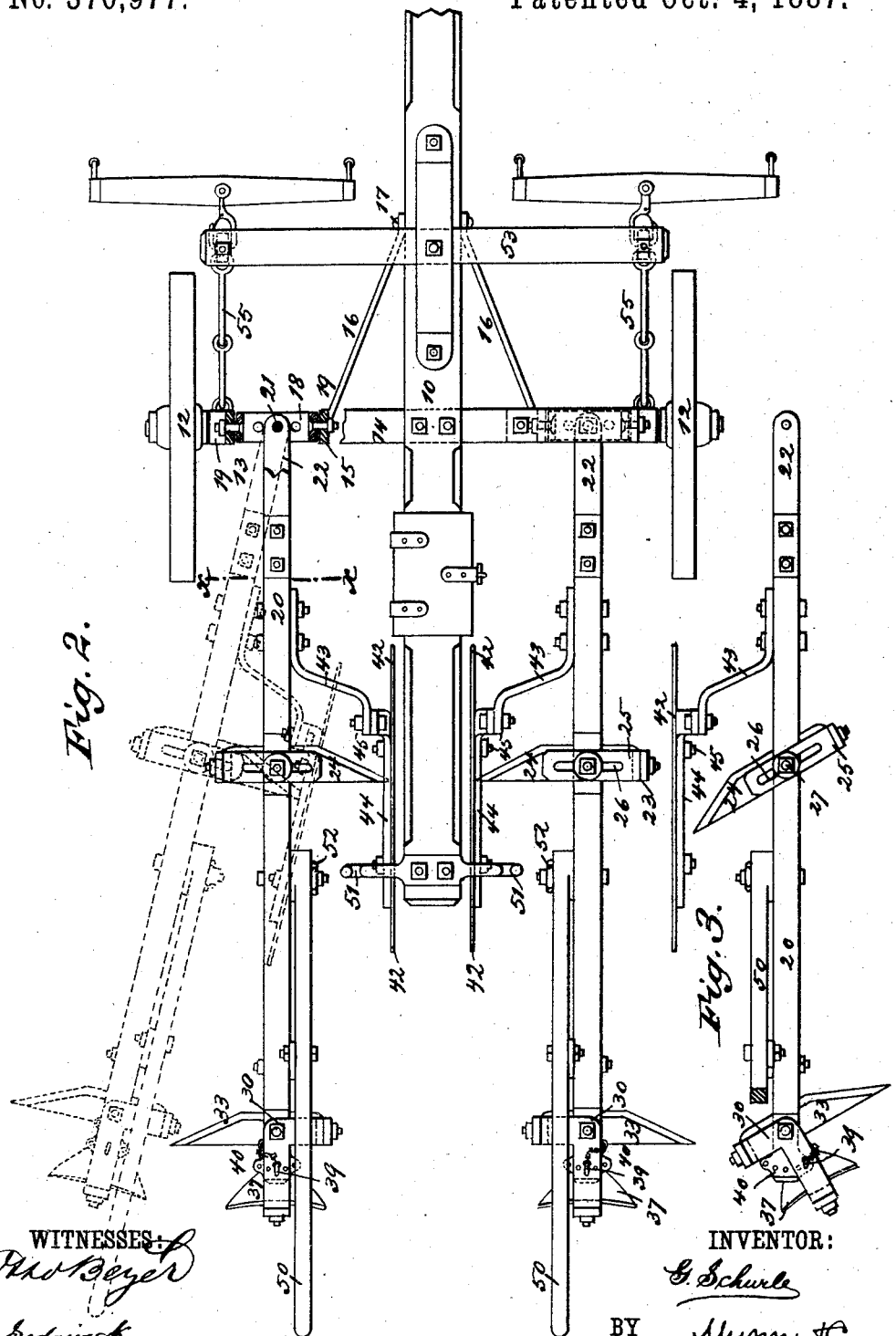

(No Model.) 4 Sheets—Sheet 4.

G. SCHÜRLE.
CULTIVATOR.

No. 370,977. Patented Oct. 4, 1887.

WITNESSES:
D. C. Reusch.
C. Sedgwick

INVENTOR:
G. Schürle
BY Munn & Co
ATTORNEYS.

UNITED STATES PATENT OFFICE.

GEORGE SCHÜRLE, OF CLAY CENTRE, KANSAS.

CULTIVATOR.

SPECIFICATION forming part of Letters Patent No. 370,977, dated October 4, 1887.

Application filed May 27, 1887. Serial No. 239,536. (No model.)

*To all whom it may concern:*

Be it known that I, GEORGE SCHÜRLE, of Clay Centre, in the county of Clay and State of Kansas, have invented a new and Improved Cultivator, of which the following is a full, clear, and exact description.

This invention relates to cultivators of the class specially adapted for use in the cultivation of listed corn; but my cultivator may be used in the cultivation of corn planted in hills, and in the cultivation of other growing plants, the object of the invention being to provide a machine wherein the parts shall be so constructed and arranged that it may be used for cultivating at all stages in the growth of the plants.

To the end named the invention consists of beams carrying cultivator knives and shovels, said beams being mounted so that they may be moved vertically and laterally, and the knives carried thereby being so mounted that they also may be laterally and vertically adjusted, the shovels being mounted so that they may be adjusted to such angle as may be required to properly deposit the fallowed earth.

Reference is to be had to the accompanying drawings, forming a part of this specification, in which similar figures of reference indicate corresponding parts in all the views.

Figure 7:
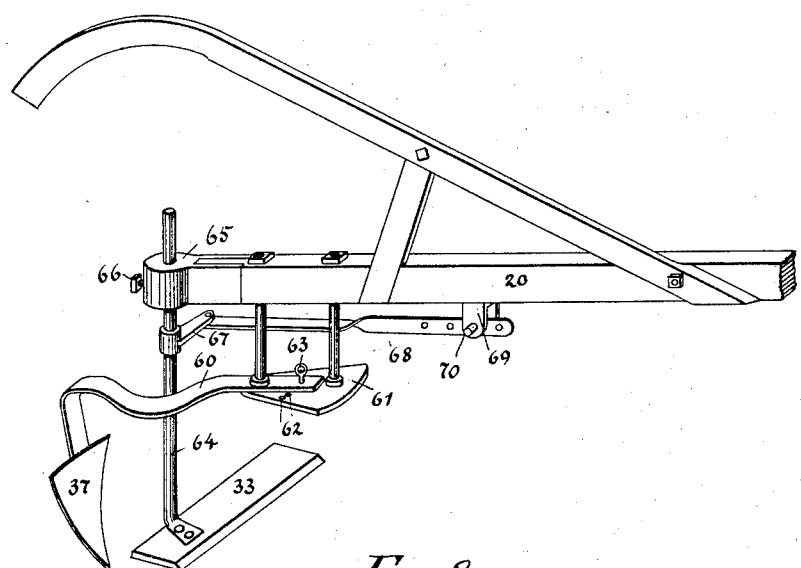
Figure 8:
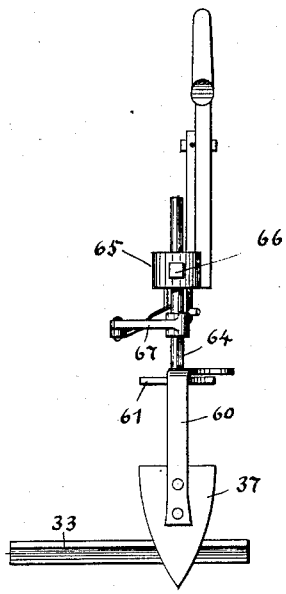

Figure 1 is a side view of my improved form of cultivator, the shovel-standard shown in the view being represented in partial central vertical section. Fig. 2 is a plan view of the cultivator, a portion of the frame being shown in section, and one of the beams being represented in dotted lines as it would appear when moved to extend outward at an angle from the main frame of the machine. Fig. 3 is a detail view of one of the cultivator-beams and its connections, the view being given to represent certain positions to which the knives and shovels may be adjusted. Fig. 4 is a rear view of the cultivator, one of the cultivator-beams being shown in section upon a line corresponding with the line $xx$ of Fig. 2. Fig. 5 is a detail perspective view of one of the cultivator-beams, representing the same as it appears when removed from the cultivator. Fig. 6 is a perspective view of the cultivator-beam and its connections, representing the parts as arranged for the cultivation of corn or plants of advanced growth. Fig. 7 is a side view of a modified construction, and Fig. 8 is a rear view of the construction illustrated in Fig. 7.

In the drawings above referred to, 10 represents the tongue or pole of the cultivator, to which tongue there is rigidly connected an axle, 11, said axle extending upward from the wheels 12 to the plane of the under face of the tongue or pole, the two upwardly-extending beams of the axle, which are shown at 13, being united by the main cross-bar of the axle, which cross-bar is shown at 14, the tongue being connected to the center of this cross-bar. Auxiliary arms 15 are bolted to the cross-bar 14, and these arms are braced by rods 16, which extend forward and upward from the lower ends of the arms to the tongue or pole 10, the two arms being connected to said tongue or pole by a bolt, 17. Between each of the arms 13 and 15 there is pivotally mounted a frame, 18, said frame being free to tilt upon its supporting-bolts 19. The forward ends of the two cultivator-beams 20 are connected to the frame 18 by pivot-bolts 21, said bolts passing through properly-located apertures that are formed in arms 22, said arms being rigidly connected to and extending forward from the beams 20. From the connection described it will be seen that the cultivator-beams may be moved in either vertical or horizontal planes.

To each of the cultivator-beams I connect standards 23, the lower ends of which are bent over at right angles to the vertical portions of the standards and form cultivator-knives 24, the standards being connected to the beams by means of angle-irons 25, the horizontal arms of which said angle-arms are formed with slots 26, through which there are passed bolts 27, while the standards themselves are formed with slots 28, through which there are passed bolts 29, the arrangement being such that the standards may be vertically adjusted upon their angle-irons and may be laterally adjusted by moving said angle-irons inward or outward over the upper face of the beam, the knives being set at such angle as may be required by turning the angle-irons upon the beams, for instance, to the position in which the parts are shown in Fig. 3.

To the rear of each of the beams I pivotally connect a double-armed bracket, 30, this connection being established by means of a pivot pin or bolt, 31, and to the outer arms, 32, of said brackets I connect cultivator-knives 33, which are formed with slots 34, provided for the purpose of adjusting the cultivator-knives to such height as may be required, while to the rear arms, 35, of each of the brackets 30 I connect shovel-standards 36, said standards carrying shovels 37, and being capable of vertical adjustment by reason of their slots 38, through which their connecting-bolts extend.

As before stated, the brackets 30 are pivotally connected to their beams; but in order that said brackets may be held at such angle as may be desired I form the rear arm of each bracket with an aperture adapted to receive a pin, 39, which pins are arranged to engage with any one of a series of apertures formed in a plate, 40, that is secured to the rear end of each of the beams, the arrangement being such that the shovels may be held in the position in which they are shown in Fig. 2, or may be adjusted to the position in which they are shown in Fig. 3, or to any other position which may be required for the proper delivery of the earth thrown up by the shovels.

It will be noticed that the rear cultivator-knives cross the under side of their beams from the inside to the outside, while the forward cultivator-knives cross from the outside to the inside, and in order that the plants may be protected from the forward knives I provide each beam with a shield or guard, 42, that is adjustably connected to a downwardly and rearwardly extending arm, 43, the shields 42 being pivotally connected to brackets 44 by pivot-pins 45 and bolts 46, which said bolts pass through curved slots 47, that are formed in the shields 42, the arrangement being such that the shields may be swung within a certain range upon their pivot-pins and then clamped to place by the bolts 46, while a vertical adjustment of the plates is obtained by passing the bolts by which the brackets are connected to the arms 43 through slots 48, that are formed in the brackets. Each of the beams is provided with a handle, 50, which handles are adjustably connected to the beams in any proper manner—for instance, by such a connection as is illustrated in the drawings, Figs. 1, 5, and 6.

To the rear end of the tongue there are secured hooks 51, and each of the beams is provided with a hook, as 52, the arrangement being such that when the cultivator is being moved from place to place the beams may be raised and their hooks 52 brought into engagement with the hooks 51, thus holding the beams and the parts carried thereby above the level of the ground.

The doubletree of the cultivator, which is shown at 53, is connected to the tongue 10, and to each end of this doubletree there is connected a downwardly-extending bar, 54, the lower end of which is connected to the axle by links 55, and the singletrees are connected to these bars 54 at such height as may be required, the bars being provided with a series of apertures, so that the connection of the singletrees may be adjusted in such position as to properly equalize the draft.

Such being the general construction of my improved form of cultivator, it will be seen that the cultivator-knives may be adjusted toward or from the plants in connection with which the machine is to be employed, and it will also be seen that the beams may be moved inward or outward, as may be desired, and raised or lowered to extend at a proper angle from the vertical frame of the machine to operate properly upon the ground irrespective of the contour of said ground; and it will be further seen that the cultivator-shovels 37 may be adjusted to any angle required, and that as the size of the plants increases the cultivator-knives may be removed and shovels substituted therefor, as illustrated in Fig. 6 of the drawings.

In Figs. 7 and 8 I illustrate a construction wherein the shovel 37 is supported by a standard, 60, which is pivotally connected to a bracket, 61, that is suspended beneath the beam 20, the end of the standard 60 extending over the bracket, which is formed with a series of apertures, 62, with any one of which the adjusting-pin 63 may be engaged, so that the angle of the shovel may be varied at will. The cultivator-knife 33 in this case is connected to a standard, 64, which is mounted in a casting, 65, that is secured to the rear end of the beam 20, the standard being vertically adjustable within the casting, and being held thereto by a set-screw, 66. In order that the angle of the knife 33 may be adjusted, I provide the standard with an arm, 67, that is connected by means of a stay-rod, 68, with a bracket, 69, a brake-pin, 70, being passed through the stay-rod and the bracket, as indicated.

Having thus fully described my invention, I claim as new and desire to secure by Letters Patent—

1. In a cultivator, the combination, with the beam, of a cultivator knife and shovel at the rear end of the beam, and pivoted brackets for adjusting the said knife and shovel vertically and laterally, substantially as herein shown and described.

2. In a cultivator, the combination, with the beam, of a double-armed bracket adjustably pivoted to the beam and knife, and shovel-standards adjustably secured to the arms of said bracket, substantially as herein shown and described.

3. In a cultivator, the combination, with a running-gear, of beams adjustably connected thereto, a bracket pivotally connected to the rear of the beams and formed with downwardly-extending arms 32 and 35, cultivator-knives connected to the arms 32, cultivator-shovels connected to the arms 35, an apertured plate connected to the beam and arranged beneath the bracket, and a pin arranged to pass through an aperture formed in the bracket and to enter an aperture formed in the plate, substantially as described.

4. In a cultivator, the combination, with the beam 20, of the knives 24 and 33, adjustably secured to the beam and projecting from opposite sides thereof, and the shovel 37, secured to the beam in rear of the knife 33, substantially as herein shown and described.

5. In a cultivator, the combination, with the beams 20, pivoted to swing vertically and horizontally, of the knives 24, secured to the beams and projecting inwardly, the shields 42, secured to the beam and extending approximately parallel therewith, the knives 33, secured to the rear end of the beam and projecting outwardly, and the shovels 37, secured to the beams in rear of the knives 33, substantially as herein shown and described.

GEORGE SCHÜRLE.

Witnesses:
P. F. C. BIEHL,
P. J. STRACK.